United States Patent
Isobe et al.

(10) Patent No.: US 9,249,869 B2
(45) Date of Patent: Feb. 2, 2016

(54) LINK ACTUATING DEVICE

(75) Inventors: Hiroshi Isobe, Iwata (JP); Yukihiro Nishio, Iwata (JP); Yoshitaka Nagano, Iwata (JP)

(73) Assignee: NTN CORPORATION, Osaka (JP)

( * ) Notice: Subject to any disclaimer, the term of this patent is extended or adjusted under 35 U.S.C. 154(b) by 353 days.

(21) Appl. No.: 13/878,523

(22) PCT Filed: Oct. 3, 2011

(86) PCT No.: PCT/JP2011/072746
§ 371 (c)(1),
(2), (4) Date: Apr. 9, 2013

(87) PCT Pub. No.: WO2012/049996
PCT Pub. Date: Apr. 19, 2012

(65) Prior Publication Data
US 2013/0192420 A1    Aug. 1, 2013

(30) Foreign Application Priority Data

Oct. 14, 2010 (JP) .................................. 2010-231433

(51) Int. Cl.
*G05B 15/00* (2006.01)
*G05B 19/00* (2006.01)
(Continued)

(52) U.S. Cl.
CPC ............... *F16H 21/54* (2013.01); *B25J 9/0048* (2013.01); *B25J 11/00* (2013.10); *B25J 9/0078* (2013.01); *Y10T 74/18888* (2015.01)

(58) Field of Classification Search
CPC .......... B25J 9/042; B25J 9/046; B25J 9/0048; B25J 9/0078; B25J 9/0081; B25J 9/106; B25J 9/1025; B25J 9/1065; B25J 9/1095; B25J 9/1692; B25J 11/00; F16H 21/04; F16H 21/54; Y10T 74/18888

USPC .................................. 700/245–264; 74/99 R
See application file for complete search history.

(56) References Cited

U.S. PATENT DOCUMENTS 4,762,016 A * 8/1988 Stoughton et al. .......... 74/490.01
6,047,610 A * 4/2000 Stocco et al. ............... 74/479.01
(Continued)

FOREIGN PATENT DOCUMENTS

| EP | 0987087 | 3/2000 |
|----|---------|--------|
| JP | 4-19082 | 1/1992 |

(Continued)

OTHER PUBLICATIONS

English machine Translation for Reference JP0801181.*
(Continued)

*Primary Examiner* — Jason Holloway
*Assistant Examiner* — Rachid Bendidi

(57) ABSTRACT

A link actuating device connects an output member to an input member through three or more link mechanisms for alteration in posture. Each of the link mechanisms includes end portion link members on input and output sides, and an intermediate link member. The link mechanisms are of such shapes that geometric models representing the link members by straight lines are such that input and output side portions are symmetrical to each other relative to an intermediate portion of each of the intermediate link members. Immobilizing mechanisms are provided in all of the link mechanisms to immobilize the output member in an arbitrary attitude relative to the input member. A structure body is provided to connect the input and output member to each other while being in contact with contacted portions formed in the input and output member.

19 Claims, 7 Drawing Sheets

(51) Int. Cl.
*F16H 21/54* (2006.01)
*B25J 11/00* (2006.01)
*B25J 9/00* (2006.01)

(56) References Cited

U.S. PATENT DOCUMENTS

| | | | | |
|---|---|---|---|---|
| 6,330,837 | B1* | 12/2001 | Charles et al. | 74/490.06 |
| 6,477,912 | B2* | 11/2002 | Song et al. | 74/490.06 |
| 6,940,582 | B1* | 9/2005 | Tanaka | 355/53 |
| 7,568,880 | B2* | 8/2009 | Horie et al. | 414/740 |
| 2001/0019692 | A1* | 9/2001 | Ehrat | 414/735 |
| 2005/0159075 | A1* | 7/2005 | Isobe et al. | 446/104 |
| 2007/0110555 | A1* | 5/2007 | Ono | 414/744.5 |
| 2008/0028881 | A1* | 2/2008 | Sone et al. | 74/471 R |
| 2008/0028883 | A1* | 2/2008 | Inada et al. | 74/490.05 |
| 2008/0226430 | A1* | 9/2008 | Minami et al. | 414/217 |
| 2010/0135751 | A1* | 6/2010 | Musha et al. | 414/217 |

FOREIGN PATENT DOCUMENTS

| | | |
|---|---|---|
| JP | 8-11081 | 1/1996 |
| JP | 11-77577 | 3/1999 |
| JP | 2000-94245 | 4/2000 |
| JP | 2000-120824 | 4/2000 |
| JP | 2004-9276 | 1/2004 |
| JP | 2005-305585 | 11/2005 |

OTHER PUBLICATIONS

International Search Report of PCT/JP2011/072746 mailed Dec. 27, 2011.
PCT International Preliminary Report on Patentability mailed May 16, 2013 in corresponding International Application No. PCT/JP2011/072746.
Japanese Office Action issued May 27, 2014 in corresponding Japanese Patent Application No. 2010-231433.

* cited by examiner

LINK ACTUATING DEVICE

CROSS REFERENCE TO THE RELATED APPLICATIONS

This application is a U.S. National Stage application of PCT/JP2011/072746 filed Oct. 3, 2011 and claims the foreign priority benefit of Japanese patent application No. 2010-231433, filed Oct. 14, 2010, the entire disclosures of which are herein incorporated by reference as a part of this application.

BACKGROUND OF THE INVENTION

1. Field of the Invention

The present invention relates to a link actuating device that may be used in a link mechanism such as a parallel link mechanism which executes work such as complicated processing or article handling in a three-dimensional space at high speed and with accuracy, or a link mechanism such as a robot joint.

2. Description of Related Art

One example of working devices including a parallel link mechanism is disclosed in Patent Document 1. The working device changes, by means of the parallel link mechanism, a position and an attitude of a traveling plate to which a tool is attached. The parallel link mechanism includes a plurality of links having lower ends to which the traveling plate is connected, and upper portions of the links are supported by universal joints such that the angles of the links are changeable and, the effective lengths of the links positioned below the universal joints are also changeable.

PRIOR ART DOCUMENT

[Patent Document 1] JP Laid-open Patent Publication No. 2000-94245

In the parallel link mechanism having the above configuration, since the working angles of the links are small, in order to set a large operating range of the traveling plate, it is necessary to increase the lengths of the links. This increases the size of the entire mechanism, resulting in increasing the size of the device. Further, the increase in the lengths of the links leads to reducing the rigidity of the entire mechanism. Thus, the weight of the tool mounted on the traveling plate, that is, the weight capacity of the traveling plate comes to be small.

SUMMARY OF THE INVENTION

It is an objective of the present invention to provide a link actuating device that is compact, has a wide movable range of a movable portion, has a high accuracy of the adjustment of an attitude, and further, has a high rigidity.

The link actuating device according to the present invention is a link actuating device to connect an output member to an input member through three or more sets of link mechanisms for alteration in posture, in which case each of the link mechanisms includes end portion link members on an input side and an output side having one ends thereof rotatably connected respectively to the input member and the output member, and an intermediate link member to which the other ends of the respective end portion link members on the input side and the output side are rotatably connected. A geometric model representing each of the link mechanisms by a straight line is such that an input side portion and an output side portion of each of the intermediate link members relative to an intermediate portion of each of the intermediate link members are symmetrical to each other. In other words, the link actuating device according to the present invention has three or more sets of link mechanisms to connect end portion link members to an input member provided on an input side and an output member provided on an output side such that the end portion link members are rotatable relative to the input member and the output member, and to connect the end portion link members on the input side and the output side to an intermediate link member such that the end portion link members on the input side and the output side are rotatable relative to the intermediate link member. The input side and the output side are geometrically identical to each other with respect to a transverse sectional plane in an intermediate portion of each of the link mechanisms. Further, immobilizing mechanisms are provided in all of the three or more link mechanisms to immobilize the output member in an arbitrary attitude relative to the input member. A structure body is provided to connect the input member and the output member to each other while being in contact with a contacted portion formed in the input member and a contacted portion formed in the output member.

According to the above structure, the input member, the output member, and the three or more link mechanisms form a two-degree-of-freedom mechanism in which the output member is movable relative to the input member in two axial directions perpendicular to each other. The two-degree-of-freedom mechanism is compact, and also, can achieve a wide range of movement of the output member. For example, the maximum bending angle between the center axis of the input member and the center axis of the output member is about ±90°, and the angle of turn of the output member with respect to the input member can be set in the range of from 0° to 360°.

The structure body is provided that connects the input member and the output member to each other, which makes it possible to achieve the effect of suppressing the rattling of the link actuating device, and also to achieve the effect of increasing the rigidity of the link actuating device. Further, since the immobilizing mechanisms are provided in all of the three or more link mechanisms, when, for example, a force has been generated between the input member and the output member by the structure body, there is no link mechanism that releases the force, and therefore, a preload is applied to the entirety of the link actuating device. As a result, the rattling of the link actuating device can be reduced and the rigidity of the link actuating device can be improved. Even when a force is not generated between the input member and the output member by the structure body, angle control is performed in all of the link mechanisms, that is, there exists none of the free link mechanisms in which angle control is not performed, when a force has acted on the output member. This results in improving the rigidity of the entirety of the link actuating device, and improving the accuracy of the adjustment of the attitude of the output member.

In the present invention, the immobilizing mechanisms may include an actuator connected directly or indirectly to the end portion link member on the input side, and the actuator acts so as to restrain rotation of the end portion link member on the input side relative to the input member. If the immobilizing members have the actuators, the attitude of the output member relative to the input member can be stably retained, and also the attitude of the output member relative to the input member can be altered.

Where the immobilizing members have the actuators, a controller may be provided that, when the immobilizing mechanism immobilizes the output member in an arbitrary attitude relative to the input member, controls the actuators so as to increase a contact force acting between the structure body and the contacted portions of the input member and the output member. The controller controls the actuators so as to increase the contact force acting between the structure body and the contacted portions of the input member and the output member, that is, so as to generate a force between the input member and the output member. By doing so, the distance is slightly changed between link spherical surface centers of the input member and the output member, and therefore, the magnitude of the contact force acting on the contacted portions can be changed. If the contact force increases, there is a force acting to maintain the link actuating device at a certain operating position against this contact force, and therefore, the rigidity of the entirety of the link actuating device can be improved when attitude adjustment is made.

When the immobilizing mechanism immobilizes the output member in an arbitrary attitude relative to the input member, the controller may control the actuators so as to drive the actuators in directions in which forces generated by the respective actuators interfere with each other. If the forces generated by the respective actuators interfere with each other, the change in the attitude of the output member relative to the input member is suppressed, and the forces act on the entirety of the link actuating device. As a result, the distance is slightly changed between the link spherical surface centers of the input member and the output member, and therefore, the magnitude of the contact force acting on the contacted portions is changed so that the rigidity of the entirety of the link actuating device can be improved.

In addition, when the attitude of the output member is altered relative to the input member, the controller may control two of the actuators such that operating positions of the two actuators approach predetermined control target positions, and may control at least one remaining actuator such that a torque generated by the at least one remaining actuator approaches a predetermined control target position. The positions of at least two of the actuators are controlled, thereby determining the position of the output member relative to the input member. The torque of the at least one remaining actuator is controlled, which makes it possible to reduce the driving forces of the above two actuators. This makes it possible to make the actuators small and compact. Further, if the positions of all of the actuators are controlled, it is necessary to drive the actuators while coordinating the positions of all of the actuators, and therefore, the operating speed may be reduced. The control of, however, the positions of only two of the actuators enables smooth operations of the actuators, and as a result, the operating speed can be increased.

In addition, in the case where the link actuating device includes a force transmitting mechanism capable of transmitting forces between the respective actuators and the respective end portion link members on the input side, when the attitude of the output member is altered relative to the input member, the controller may control two of the actuators such that operating positions of the two actuators approach predetermined control target positions, and may control at least one remaining actuator such that a torque generated by the at least one remaining actuator approaches a predetermined control target position, or may drive the at least one remaining actuator in a servo-off state where a feedback control function is off. If a force transmitting mechanism is provided that can transmit forces between the actuators and the end portion link members on the input side, the torques of the end portion link members on the input side, driven by the actuators whose positions are controlled, are transmitted to the at least one remaining actuator through the force transmitting mechanism. Accordingly, it is possible to drive the at least one remaining actuator not only by torque control, but also in a servo-off state.

In the case where each of the actuators is a rotary actuator, the rotary actuator may have a brake device that locks a rotation of a rotary shaft of the rotary actuator. When the output member is immobilized in an arbitrary attitude relative to the input member, the brake device may be actuated. By braking the rotary shafts of the actuators, it is possible to maintain a certain angle even if the torques are transmitted to the actuators. Therefore, the rigidity of the entirety of the link actuating device can be improved when attitude adjustment is made.

The attitude of the output member relative to the input member may be controlled by inverse-transforming a formula represented by $\cos(\theta/2)\sin \beta n - \sin(\theta/2)\sin(\phi + \delta n)\cos \beta n + \sin(\gamma/2) = 0$, where an angle of rotation of the end portion link member on the input side relative to the input member is $\beta n$; an angle between an axis of a connecting end of the intermediate link member, rotatably connected to the end portion link member on the input side, and an axis of a connecting end of the intermediate link member, rotatably connected to the end portion link members on the output side, are $\gamma$; a space angle, in a circumferential direction, of each of the end portion link members on the input side relative to one of the end portion link members on the input side, which serves as a reference, is $\delta n$; a vertical angle of an inclination of the output member relative to a center axis of the input member is $\theta$; and a horizontal angle of an inclination of the output member relative to the center axis of the input member is $\phi$. If the attitude of the output member relative to the input member is specified, it is possible to calculate the angles of rotation of the end portion link members on the input side by the above formula. On the basis of the calculated values, outputs are sent to the actuators that drive the end portion link members on the input side, and as a result, it is possible to control the attitude of the output member relative to the input member.

In the present invention, the structure may generate a force between the input member and the output member. When the structure body generates a force between the input member and the output member, the rattling of the link actuating device is eliminated and the rigidity of the link actuating device can be improved. This results in improving the accuracy of the adjustment of the attitude of the output member relative to the input member.

In the present invention, each of the input member and the output member may have the same number of shaft portions as the number of the link mechanisms, the shaft portions protruding from an outer peripheral surface thereof, the end portion link members on the input side and the output side of each of the link mechanisms are rotatably connected to the shaft portions, and the contacted portions are arranged radially inwardly of the shaft portions. According to the above structure, the shaft portions protrude from the outer peripheral surfaces of the input member and the output member, and therefore, the shaft portions can be rotatably supported by bearings provided in the end portion link members on the input side and the output side. Because of this, it is possible to secure wide spaces in the central portions of the input member and the output member, and the contacted portions can be easily defined in these wide spaces.

In the present invention, the contacted portions of the input member and the output member may have spherical shapes whose centers conform with link spherical surface centers of the respective link mechanisms, and the structure body may have opposite ends provided with spherical contacting portions that are slidably fitted into the contacted portions. The spherical-shaped contacted portions of the input member and the output member and the spherical contacting portion of the structure contact with each other, and therefore, even if a change has been made in the operating position of the link actuating device, the state where the contacted portions and the contacting portion are always in contact with each other can be maintained, without affecting the operation of the link actuating device.

The structure body may include an input side structure portion having a contacting portion fitted into the contacted portion of the input member and an output side structure portion having a contacting portion fitted into the contacted portion of the output member, and a distance between centers of the contacting portions of the input side structure portion and the output side structure portion may be changeable. If the distance between the centers of the contacting portions of the input side structure portion and the output side structure portion is changeable, it is possible to adjust the magnitude of the force to be generated between the input member and the output member by the structure body.

For example, one of the input side structure portion and the output side structure portion may have a male threaded portion, and the other thereof may have a female threaded portion engaged with the male threaded portion, in which case, by changing an amount of thread engagement between the male threaded portion and the female threaded portion, the distance is adjusted between the centers of the contacting portions of the input side structure portion and the output side structure portion. This structure facilitates the adjustment of the magnitude of the force to be generated between the input member and the output member by the structure body.

In addition, an input side sliding portion and an output side sliding portion may be provided in the input side structure portion and the output side structure portion, respectively, so as to be slidable relative to each other along a straight line connecting centers of spherical contacting portions of the input side structure portion and the output side structure portion. In this case, it is possible to employ a technique in which the input side structure portion and the output side structure portion cooperate together to form a space portion, so that a fluid is introduced and discharged into and from the space portion, thereby sliding the input side sliding portion and the output side sliding portion relative to each other, and a technique in which a piezo actuator is provided that slides the input side sliding portion and the output side sliding portion relative to each other. As described above, the provision of the input side sliding portion and the output side sliding portion in the input side structure portion and the output side structure portion, respectively, also facilitates the adjustment of the magnitude of the force to be generated between the input member and the output member by the structure body in a similar manner to the above.

In the present invention, the input member may have a recessed portion that is conical and tapered on an end face thereof on the output member side, and the output member may have a recessed portion that is conical and tapered on an end face thereof on the input member side, in which case innermost portions of the recessed portions serve as the contacted portions. This configuration makes it possible to effectively prevent the structure body from interfering with the input member and the output member, and as a result, it is possible to achieve a wide operating range of the link actuating device.

In the case of the above configuration, a maximum bending angle of a bending angle, which is an angle between a center line of the input member and a center line of the output member, may be $\theta_{max}$; and an angle between a generatrix of an inner peripheral surface of the recessed portion of the input member and the center line of the input member, and an angle between a generatrix of an inner peripheral surface of the recessed portion of the output member and the center line of the output member may be both $\theta_{max}/2$. With this configuration, if the bending angle exceeds the maximum bending angle, the structure body contacts with both the inner peripheral surface of the recessed portion of the input member and the inner peripheral surface of the recessed portion of the output member. Thus, the operating range of the link actuating device is limited, and the reliability of the link actuating device can be improved.

In the present invention, rotational angle detectors may be provided in two or more of the three or more link mechanisms to detect angles of rotation of the end portion link members on the input side. The provision of rotational angle detectors enables feedback control using the values detected by the rotational angle detectors. This reduces the influences of the rattling of the immobilizing mechanisms and the rigidity of the immobilizing mechanisms, and the accuracy of the adjustment of the attitude of the output member relative to the input member can be improved.

The attitude of the output member relative to the input member may be estimated by forward-transforming a formula represented by $\cos(\theta/2)\sin \beta n - \sin(\theta/2)\sin(\phi) + \delta n)\cos \beta n + \sin(\gamma/2) = 0$, where an angle of rotation of the end portion link members on the input side relative to the input member is $\beta n$, an angle between an axis of a connecting end of the intermediate link member, rotatably connected to the end portion link member on the input side, and an axis of a connecting end of the intermediate link member, rotatably connected to the end portion link members on the output side, are $\gamma$; a space angle, in a circumferential direction, of each of the end portion link members on the input side relative to one of the end portion link members on the input side, which serves as a reference, is $\delta n$; a vertical angle of an inclination of the output member relative to a center axis of the input member is $\theta$; and a horizontal angle of an inclination of the output member relative to the center axis of the input member is $\phi$. On the basis of the angles of rotation of two or more of the end portion link members on the input side, detected by the rotational angle detectors, it is possible to estimate the attitude of the output member relative to the input member.

Any combination of at least two configurations, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
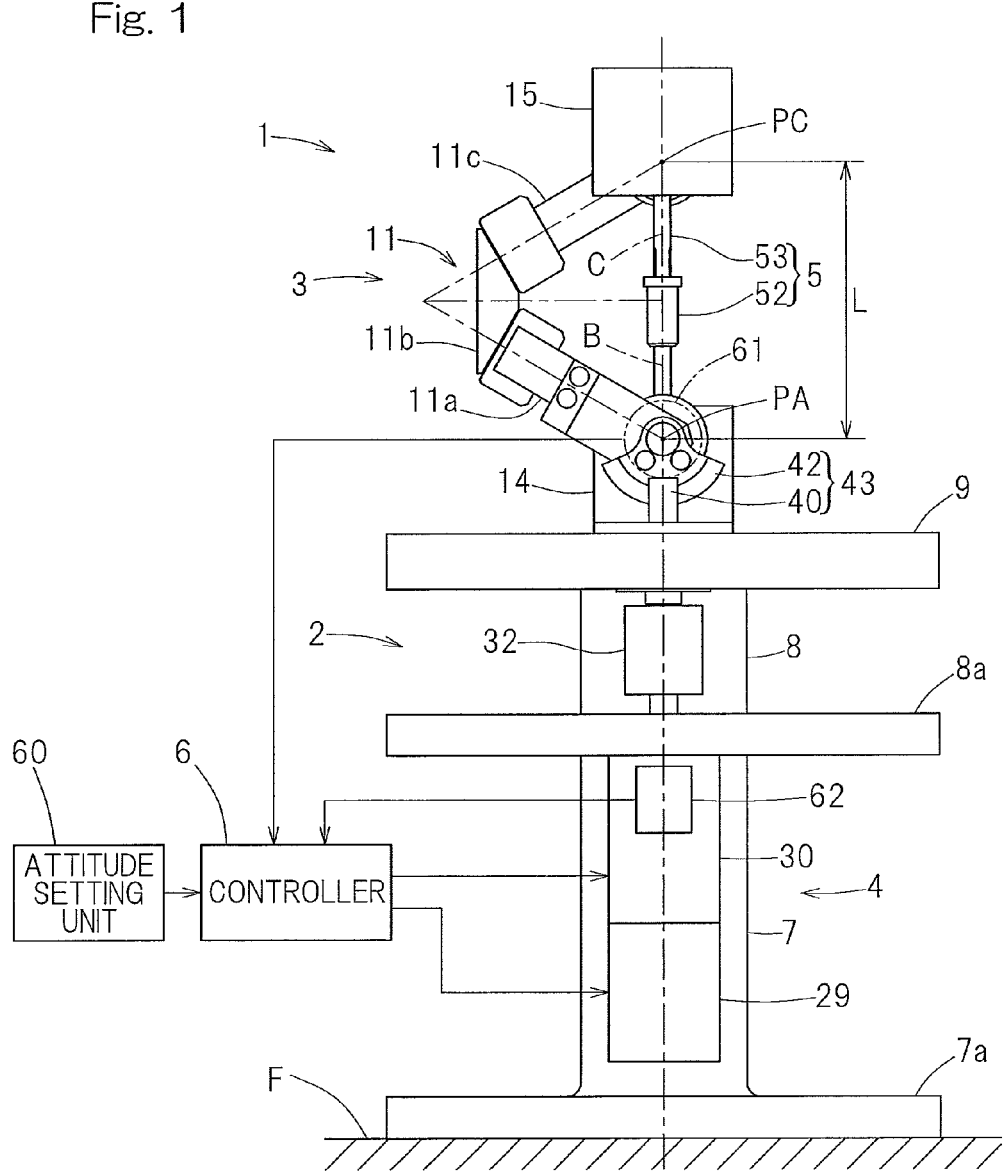
FIG. 1 is a diagram obtained by adding a block diagram of a control system to a front elevational view of a link actuating device according to a first preferred embodiment of the present invention, a part of the link actuating device omitted from the front elevational view.
Figure 2:
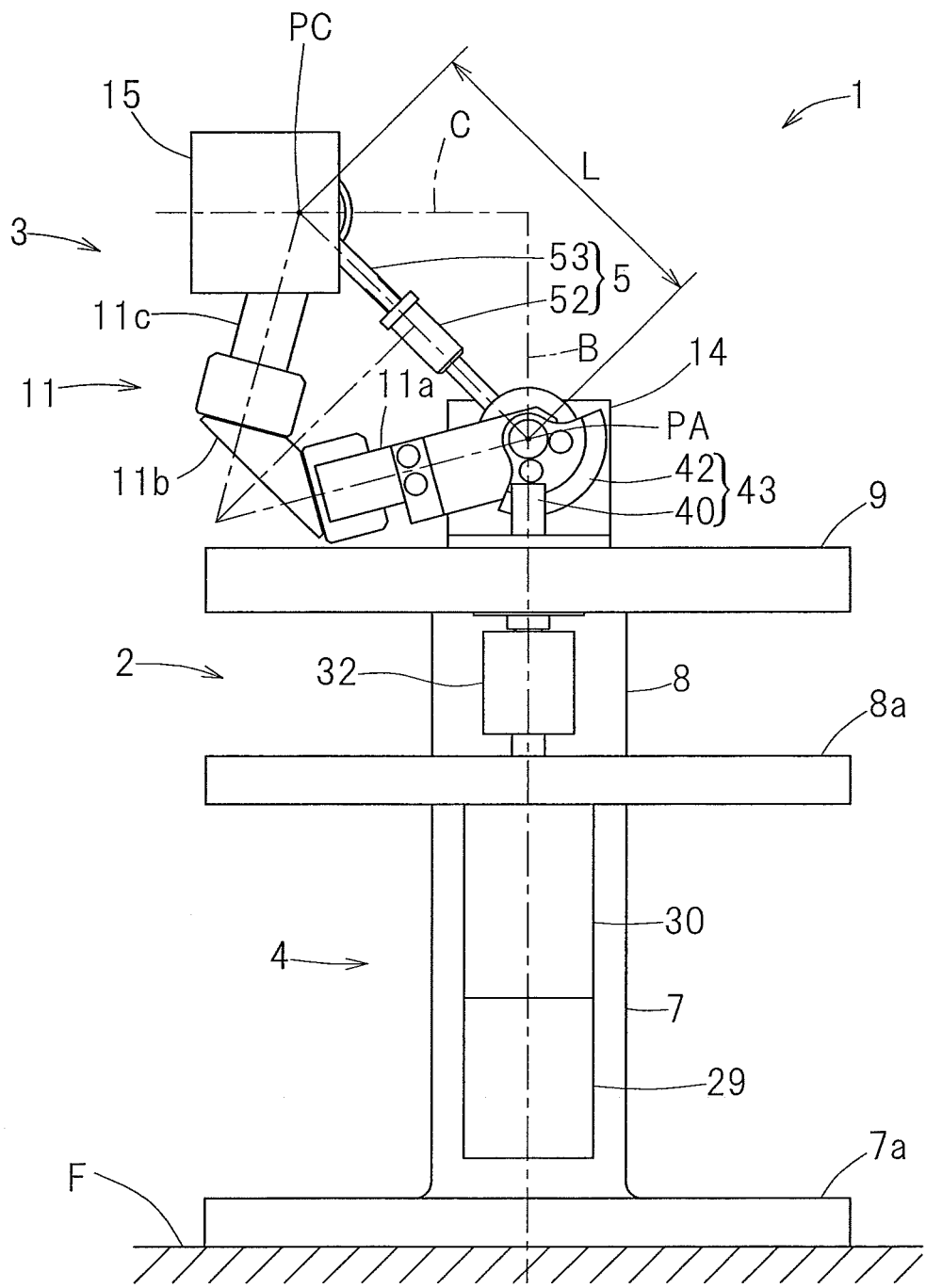
FIG. 2 is a front elevational view of the link actuating device in a different state, a part of the link actuating device omitted from the front elevational view.

With reference to FIGS. 1 to 8, a first preferred embodiment of the present invention is described. As shown in FIGS. 1 and 2, a link actuating device 1 includes a base unit 2 and a link mechanism section 3 having input side supported by the base unit 2 and an output side on which a driven device such as a medical actuator is mounted. The link actuating device 1 also includes standstill holding mechanisms or immobilizing mechanisms 4 which immobilize the link mechanism section 3 in a certain state, a structure body 5 which connects an input member 14 and an output member 15 of the link mechanism section 3 to each other, and a controller 6.

The base unit 2 has a three-layer structure composed of a base member 7, a motor mounting member 8, and a link fitting member 9. The base member 7, which is the lower layer, is installed on a horizontal installation surface F by a plate-like portion 7a such as a disk provided at the lower end of the base member 7. The motor mounting member 8, which is the middle layer, has a plate-like portion 8a such as a disk at its lower end, and is installed above the base member 7. The link fitting member 9, which is the upper layer, is a plate-like member such as a disk, and is installed above the motor mounting member 8.

Figure 3:
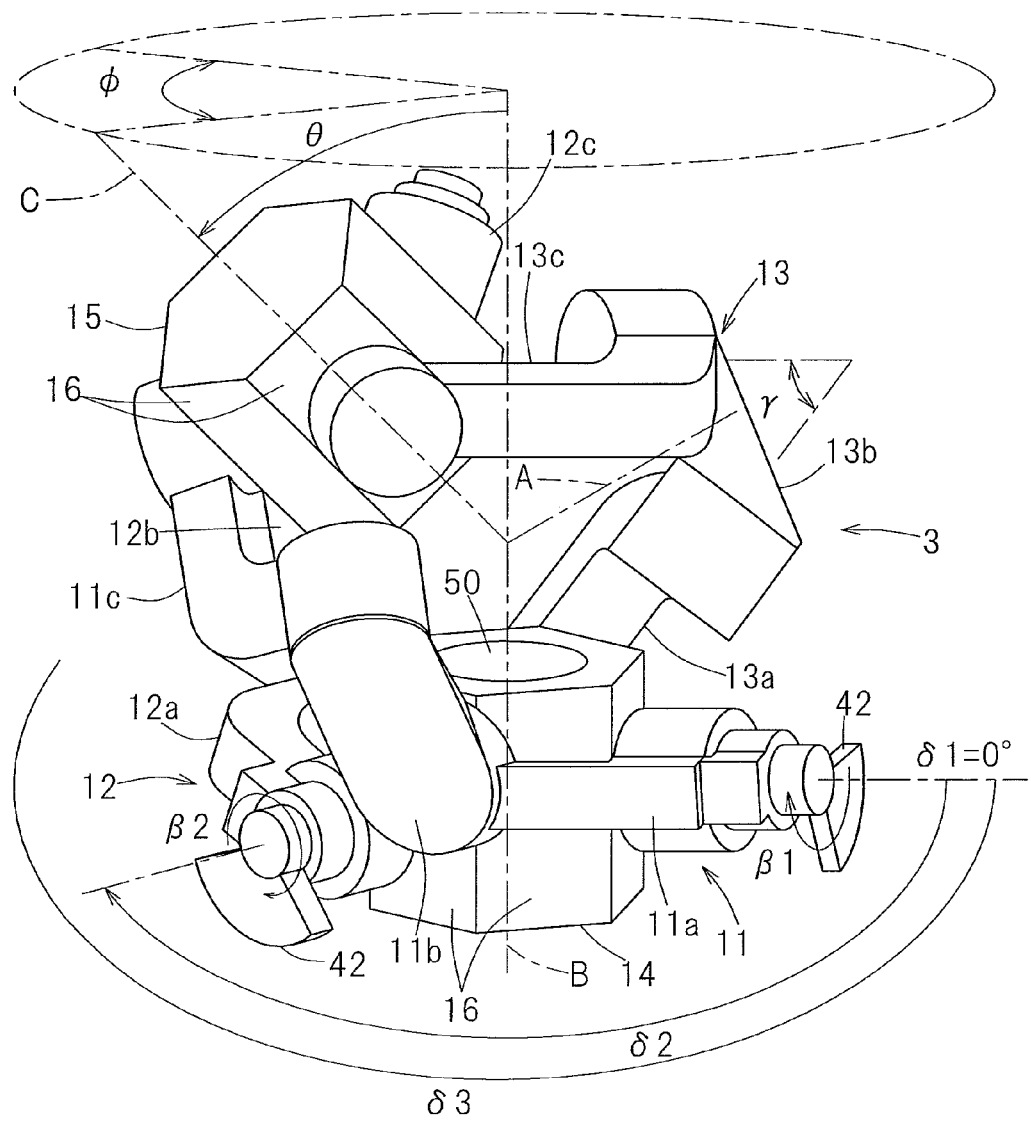
FIG. 3 is a perspective view of the link actuating device.

As shown in FIG. 3, the link mechanism section 3 includes three sets of link mechanisms 11, 12 and 13 (hereinafter designated by 11 to 13). It is to be noted that in FIGS. 1 and 2, only one set of the link mechanism 11 is illustrated. The three sets of those link mechanisms 11 to 13 have respective shapes that are geometrically identical with each other. In other words, each of the link mechanisms 11 to 13 is of such a shape that geometric models of each of link members 11a to 13a, 11b to 13b and 11c to 13c, when schematically expressed by lines, is such that an input side portion and an output side portion relative to an intermediate portion of the intermediate link members 11b to 13b are symmetrical to each other.

Each of the link mechanisms 11, 12 and 13 is made up of an end portion link member 11a, 12a and 13a (hereinafter designated as 11a to 13a) on the input side, an intermediate link member 11b, 12b and 13b (hereinafter designated as 11b to 13b) and an end portion link member 11c, 12c and 13c (hereinafter designated as 11c to 13c) on an output side, and forms a three-link chain mechanism comprised of four revolve pairs. The end portion link members 11a to 13a on the input side and the end portion link members 11c to 13c on the output side are L-shaped such that the base ends of the end portion link members 11a to 13a are rotatably connected to the input member 14, and the base ends of the end portion link members 11c to 13c are rotatably connected to the output member 15. Each of the intermediate link members 11b to 13b has one end rotatably connected to the tip of the corresponding one of the end portion link members 11a to 13a on the input side and the other end rotatably connected to the tip of the corresponding one of the end portion link members 11c to 13c on the output side.

Each of the end portion link members 11a to 13a on the input side and the end portion link members 11c to 13c on the output side is of a spherical surface link structure. The former three link members 11a to 13a have a common spherical surface link center PA and the latter three link members 11c to 13c have a common spherical surface link center PC. In each of the three link mechanism 11 to 13, distances from the associated center PA or PC to the respective three end portion link members 11a to 13a or 11c to 13c are the same. The axes of the revolute pairs, which define joints between the end portion link member 11a to 13a or 11c to 13c and the intermediate link member 11b to 13b may have a certain crossed axes angle or may be parallel to each other.

Figure 4:
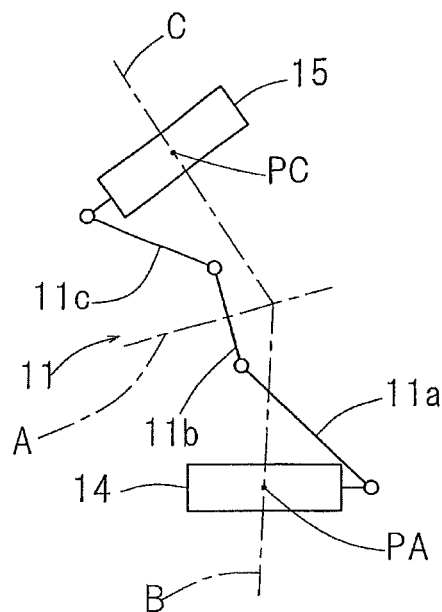
FIG. 4 is a diagram representing one of link mechanisms of the link actuating device by straight lines.

That is, the three link mechanisms 11 to 13 have shapes geometrically identical to each other. Shapes geometrically identical to each other mean that the link mechanisms 11 to 13 are of such shapes that geometric models representing the link members 11a to 13a, 11b to 13b, and 11c to 13c by straight lines are such that an input side portion and an output side portion are symmetrical to each other relative to an intermediate portion of each of the intermediate link members 11b to 13b. FIG. 4 is a diagram representing one of the link mechanisms, namely the link mechanism 11, by straight lines.

The link mechanism 11 to 13 employed in this preferred embodiment is of a rotation symmetrical type and the positional relation between an input side group of the input member 14 and the end portion link member 11a to 13a on the input side and an output side group of the output member 15 and the end portion link member 11c to 13c on the output side is such as to form a positional construction in which the positional relation is rotationally symmetrical with respect to a center line A of the intermediate link member 11b to 13b. FIG. 1 illustrates a condition in which a center axis B of the input member 14 and a center axis C of the output member 15 lie on the same line and FIG. 2 illustrates a condition in which the center axis C of the output member 15 relative to the center axis B of the input member 14 assumes a predetermined working angle. Even when each of the link mechanisms 11 to 13 changes in its posture, the distance L between the spherical surface link centers PA and PC on the input side and the output side does not change.

Each of the input member 14 and the output member 15 has a hexagonal prism shape, whose outer peripheral surface is formed of six lateral faces 16 so that every other three of the lateral faces 16 are rotatably connected to the end portion link members 11a to 13a on the input side or the end portion link members 11c to 13c on the output side.

Figure 5:
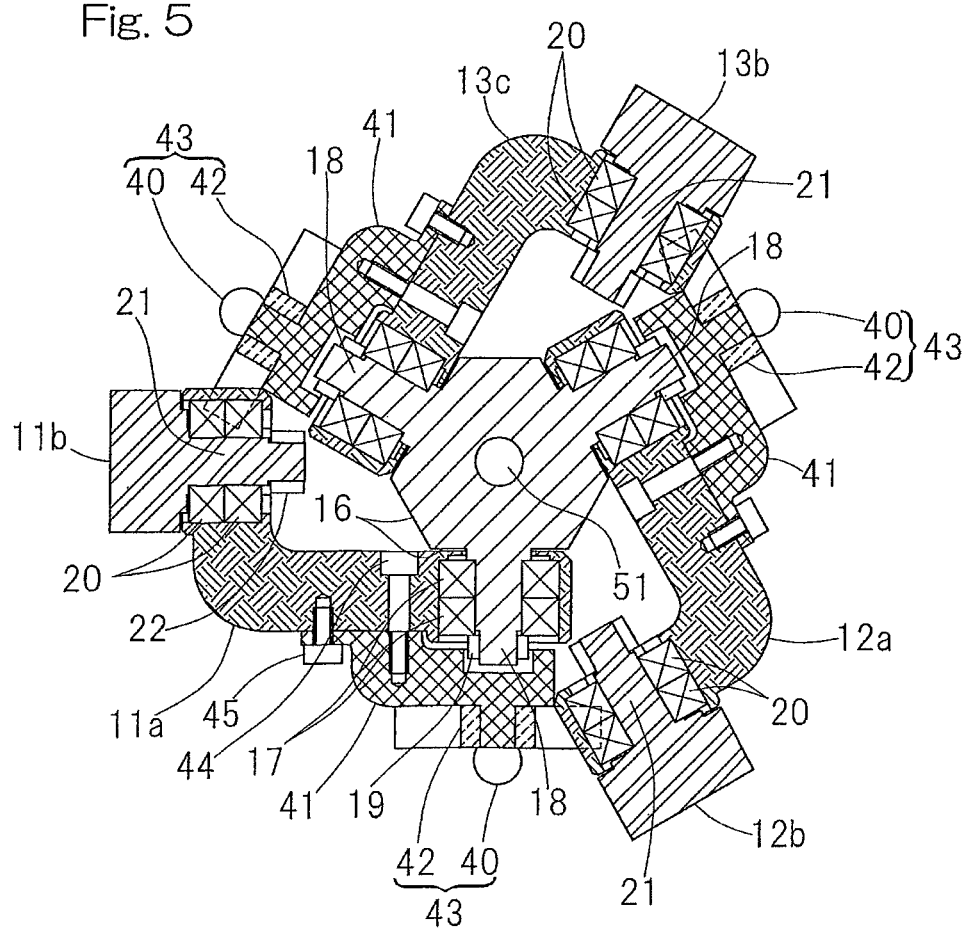
FIG. 5 is a cross-sectional view of an input member, end portion link members on an input side, and an intermediate link member of the link actuating device.

FIG. 5 is a cross-sectional view showing the joint portions between the input member 14 and the end portion link members 11a to 13a on the input side. Shaft portions 18 protrude from the lateral faces 16 of the input member 14, so that inner rings (not shown) of double-row bearings 17 are mounted externally on the respective shaft portions 18, and outer rings (not shown) of the bearings 17 are inserted into the end portions, on the input member side, of the end portion link members 11a to 13a on the input side. That is, the structure is such that the inner rings are fixed to the input member 14, and the outer rings rotate together with the end portion link members 11a to 13a on the input side. The bearings 17 are, for example, ball bearings such as deep groove ball bearings or angular contact ball bearings, and are fixed with a predetermined amount of preload applied by means of a nut 19. The bearings 17 may be roller bearings or slide bearings, instead of arranging ball bearings in two rows as shown in the illustrated example. The joint portions between the output member 15 and the end portion link members 11c to 13c on the output side also have similar structures.

In addition, the end portion link members 11a to 13a on the input side and the intermediate link members 11b to 13b are rotatably connected to each other at their joint portions through double-row bearings 20. That is, outer rings (not shown) of the bearings 20 are mounted externally on the end portion link members 11a to 13a on the input side, and inner rings (not shown) of the bearings are mounted externally on shaft portions 21 provided in the respective intermediate link members 11b to 13b. The bearings 20 are, for example, ball bearings such as deep groove ball bearings or angular contact ball bearings, and are fixed with a predetermined amount of preload applied by means of a nut 22. The bearings 20 may be roller bearings or slide bearings, instead of arranging ball bearings in two rows as shown in the illustrated example. The joint portions between the end portion link members 11c to 13c on the output side and the intermediate link members 11b to 13b also have similar structures.

In each of the link mechanisms 11 to 13, the angle and the length of the shaft portion and the geometric shape of the end link member 11a to 13a and 11c to 13c may be equal to each other on the input side and the output side and even the intermediate link member 11b to 13b have its input and output sides that are similar in shape to each other. Also, the angular positional relation, relative to the plane of symmetry of the intermediate link member 11b to 13b, between the intermediate link member 11b to 13b and the end portion link member 11a to 13a and 11c to 13c that are connected with the input and output members 14 and 15 may be similar to each other on the input side and the output side. In such a case, the input side group of the input member 14 and the end portion link member 11a to 13a and the output side group of the output member 15 and the end portion member 11c to 13c will move in the same manner because of the geometrical symmetry and the input and output side groups will rotate the same angle in the same manner at a constant speed. The plane of symmetry of the intermediate link member 11b to 13b when rotating at the constant speed is referred to as an isokinetic bisecting plane.

Because of the foregoing, when a plurality of the link mechanisms 11 to 13 of the same geometric shape having the input and output members 14 and 15 in common are arranged on a circumference, as the position at which those link mechanisms 11 to 13 can move with no ambiguity, the intermediate link members 11b to 13b is limited to the movement on the isokinetic bisecting plane and, hence, the isokinetic rotation can be obtained even when the input and output side groups assume arbitrary working angles.

Each of the link mechanisms 11 to 13 has rotatable portions of the four revolve pairs comprised of a first joint portion between the end portion link member 11a to 13a and the input member 14, a second joint portion between the end portion link member 11c to 13c and the output member 15, a third joint portion between the end portion link member 11a to 13a and the intermediate link members 11b to 13b, and a fourth joint portion between the end portion link member 11c to 13c and the intermediate link members 11b to 13b. By designing these four rotatable portions as respective bearing structure, it is possible to reduce the rotational resistance, while the frictional resistance at those joint portions is suppressed, and hence, not only can a smooth power transmission be secured, but also the durability can be increased.

According to the link mechanism section 3 of the structure described hereinabove, the range of movement of the output member 15 relative to the input member 14 can be made large. By way of example, the maximum bending angle defined between the center axis B of the input member 14 and the center axis C of the output member 15 can be rendered to be about ±90°. Also, the angle of turn of the output member 15 relative to the input member 14 can be made within the range of 0 to 360°. The bending angle $\theta$ refers to the vertical angle of the inclination of the output member 15 relative to the center axis B of the input member 14. The angle of turn $\phi$ refers to the horizontal angle of the inclination of the output member 15 relative to the center axis B of the input member 14.

The immobilizing mechanisms 4 immobilize the link mechanism section 3 in a certain state, thereby immobilizing the output member 15 in an arbitrary attitude relative to the input member 14. The immobilizing mechanisms 4 are provided in all of the three link mechanisms 11 to 13. The respective immobilizing mechanisms 4 are connected directly or indirectly to the end portion link members 11a, 12a, and 13a on the input side, and include rotary actuators 30 having brake devices 29 that act so as to restrain the rotations of the end portion link members 11a, 12a, and 13a on the input side relative to the input member 14. When the immobilizing member 4 has the actuator 30, the attitude of the output member 15 relative to the input member 14 can be stably retained, and also the attitude of the output member 15 relative to the input member 14 can be altered. The brake device 29 is, for example, an electromagnetic brake, and is a mechanism to lock the rotation of the rotary shaft of the rotary actuator 30. The rotary actuator 30 and the brake device 29 are fitted to the plate-like portion 8a of the motor mounting member 8 so as to extend in the vertical direction.

Figure 6:
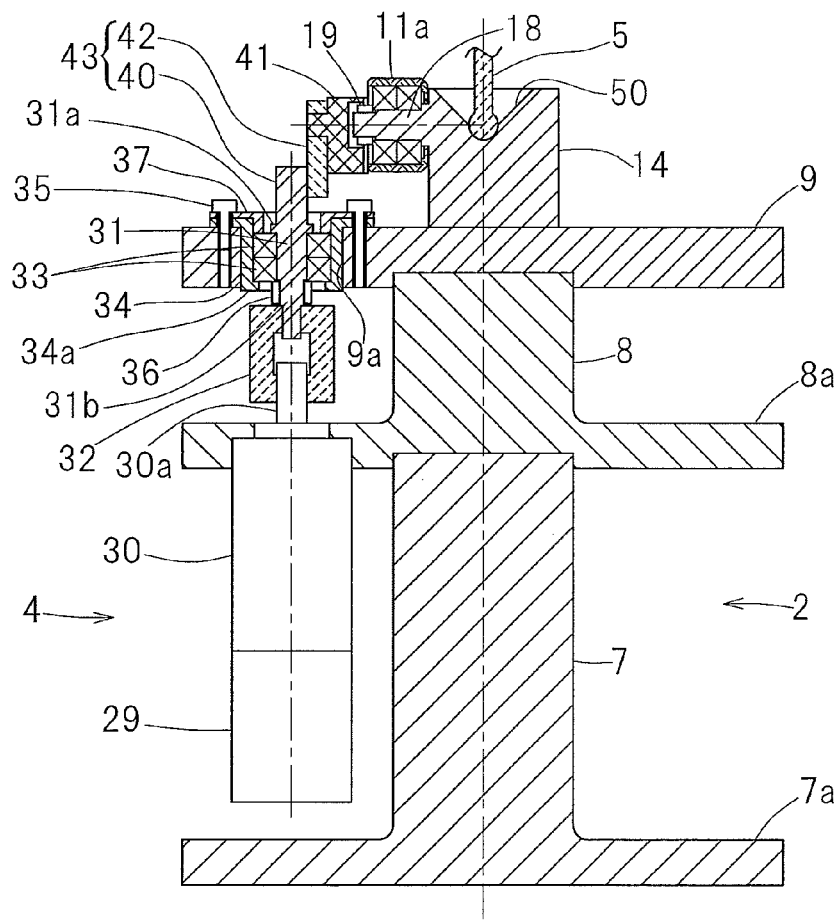
FIG. 6 is a cutaway side view of a part of the link actuating device.

As shown in FIG. 6, an output shaft 30a in each of the rotary actuators 30 protrudes upward, and the output shaft 30a and a pinion shaft 31 are connected to each other through a coupling 32. The pinion shaft 31 is arranged coaxially with the output shaft 30a, and is rotatably supported by a double-row bearing 33 provided in the link fitting member 9. Specifically, a cylindrical pinion shaft supporting holder 34 is press-fitted to a holder press-fitting hole 9a formed in the link fitting member 9, so that the double-row bearing 33 is accommodated in the pinion shaft supporting holder 34. The pinion shaft supporting holder 34 is fixed to the link fitting member 9 by means of a bolt 35. The double-row bearing 33 is, for example, a ball bearing such as a deep groove ball bearing or an angular contact ball bearing. The axial position of an inner ring (not shown) of the double-row bearing 33 is positioned by a flange portion 31a of the pinion shaft 31 and a nut 36 engaged with a threaded portion 31b of the pinion shaft 31. The axial position of an outer ring (not shown) of the double-row bearing 33 is positioned by a flange portion 34a of the shaft supporting holder 34 and a positioning member 37 fixed, together with the shaft supporting holder 34, to the link fitting member 9 by means of the bolt 35.

The portion above the flange portion 31a in the pinion shaft 31 is defined as a pinion 40, in which spiral gear teeth are formed in its periphery. Meanwhile, a joint member 41 is fixedly fitted to the revolute pair portion between each of the end portion link members 11a to 13a on the input side and the shaft portion 18, and the joint member 41 is provided with a sector-shaped gear 42, in which spiral gear teeth are formed so as to mesh with the pinion 40. The center axis of the sector-shaped gear 42 coincides with the center axis of the shaft portion 18. The center axis of the pinion 40 and the center axis of the sector-shaped gear 42 are perpendicular to each other when viewed from the front, and are offset from each other in the front-back direction. That is, the pinion 40 and the sector-shaped gear 42 are hypoid gears and cooperate together to form a force transmitting mechanism 43. The force transmitting mechanism 43, composed of hypoid gears, can have a high reduction ratio, and can transmit forces in both forward and reverse directions. It should be noted that, as shown in FIG. 5, the joint members 41 are fixed to the end portion link members 11a to 13a on the output side by means of bolts 44 and 45.

Figure 7:
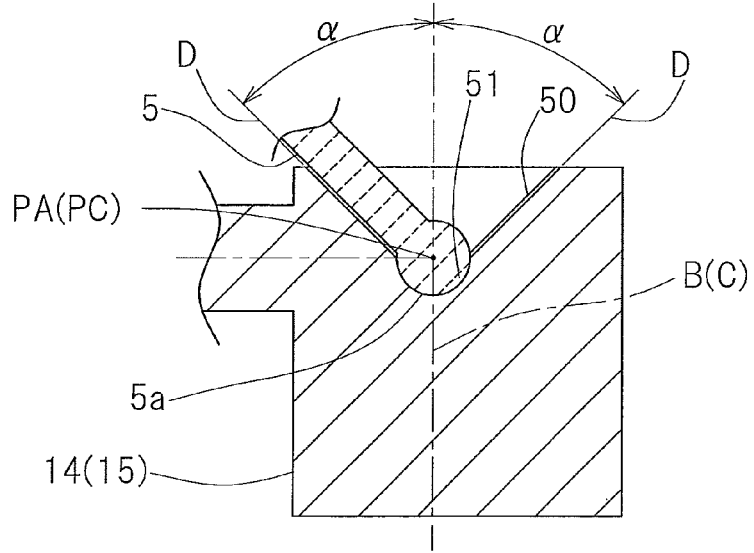
FIG. 7 is an enlarged cutaway side view of a part of the link actuating device.

The structure body 5 has opposite ends to contact with contacted portions of the input member 14 and the output member 15, respectively and is operable to generate a force between the input member 14 and the output member 15. FIG. 7 shows the contacted portion of the input member 14. Although not shown in the figures, the contacted portion of the output member 15 is similar to this. A recessed portion 50 is formed in the end face opposing the output member 15 (the input member 14) of the input member 14 (the output member 15) so as to be conical and tapered, and the innermost portion of the recessed portion 50 is defined as a spherical contacted portion 51. The center of the spherical contacted portion 51 coincides with the spherical surface link center PA (PC) on the input side (the output side). The opposite ends of the structure body 5, forming contacting portions 5a, have spherical shapes slidably fitted into the respective contacted portions 51.

An angle $\alpha$ between a generatrix D of the inner peripheral surface of the recessed portion 50 and the center line B (C) of the input member 14 (the output member 15) is defined as $\alpha = \theta_{max}/2$, where the maximum bending angle of the bending angle $\theta$ (FIG. 3), which is the angle between the center line B of the input member 14 and the center line C of the output member 15, is $\theta_{max}$.

With such a configuration, if the bending angle $\theta$ exceeds the maximum bending angle $\theta_{max}$, the structure body 5 comes into contact with both the inner peripheral surface of the recessed portion 50 of the input member 14 and the inner peripheral surface of the recessed portion 50 of the output member 15. This limits the operating range of the link actuating device, and as a result, the reliability of the link actuating device can be improved.

Figure 8:
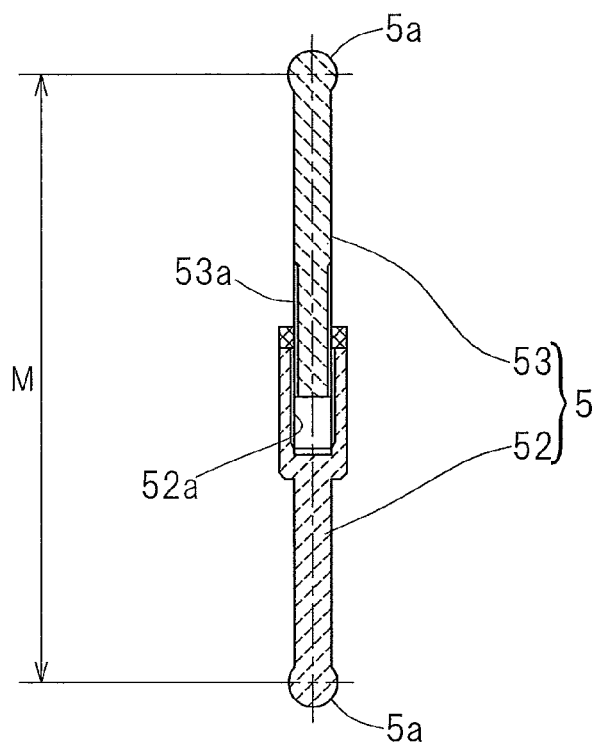
FIG. 8 is a cross-sectional view of a structure body of the link actuating device.

As shown in FIG. 8, the structure body 5 includes an input side structure portion 52 having the contacting portion 5a fitted into the contacted portion 51 of the input member 14, and an output side structure portion 53 having the contacting portion 5a fitted into the contacted portion 51 of the output member 15. A female threaded portion 52a of the input side structure portion 52 and a male threaded portion 53a of the output side structure portion 53 are engaged with each other. By changing the amount of thread engagement between the male threaded portion 52a and the female threaded portion 53a, a distance M is adjusted between the centers of the contacting portions 5a of the input side structure portion 52 and the output side structure portion 53. The configuration may be such that a male threaded portion (not shown) is provided in the input side structure portion 52, and a female threaded portion (not shown) is provided in the output side structure portion 53. Such a configuration facilitates the adjustment of the magnitude of the force to be generated between the input member 14 and the output member 15 by the structure body 5.

The configuration of the structure body 5 may be such that the input side structure portion 52 and the output side structure portion 53 are slid relative to each other, thereby changing the distance M between the centers. When the distance M between the centers of the contacting portions of the input side structure portion 52 and the output side structure portion 53 may be thus changeable, it is possible to adjust the magnitude of the force to be generated between the input member 14 and the output member 15 by the structure body 5.

As described above, according to the first preferred embodiment, the structure body 5 is provided that connects the input member 14 and the output member 15 to each other, and therefore, it is possible to achieve the effect of suppressing the rattling of the link actuating device, and also to achieve the effect of increasing the rigidity of the link actuating device.

Figure 9:
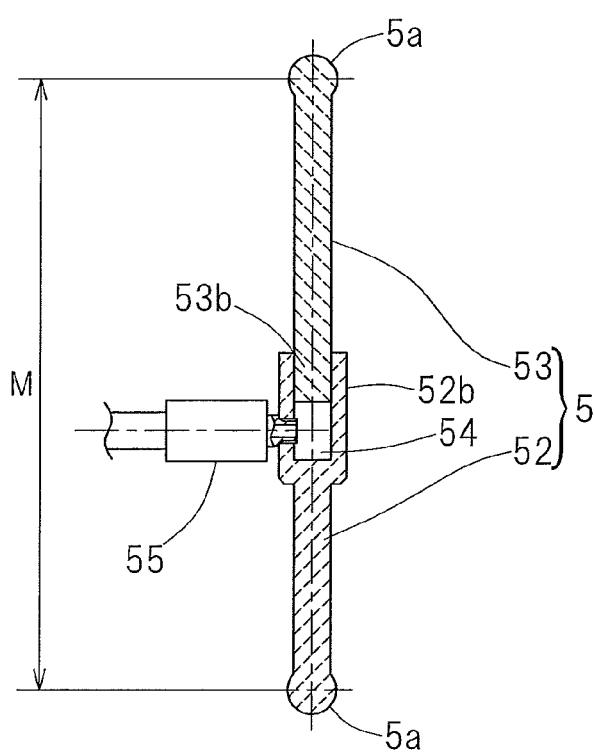
FIG. 9 is a longitudinal cross-sectional view of a structure body of a link actuating device according to a second preferred embodiment of the present invention.

A structure body 5 of a link actuating device according to a second preferred embodiment shown in FIG. 9 includes an input side structure portion 52 provided with an input side sliding portion 52b and an output side structure portion 53 provided with an output side sliding portion 53b, and the input side sliding portion 52b and the output side sliding portion 53b are slidable relative to each other along a straight line connecting the centers of spherical contacting portions of the input side structure portion 52 and the output side structure portion 53, respectively. That is, the cylindrical input side sliding portion 52b is provided in the input side structure portion 52, and the output side sliding portion 53b slidable relative to the input side sliding portion 52b is provided in the output side structure portion 53, so that the input side structure portion 52 and the output side structure portion 53 are slidable relative to each other. In a space portion 54 formed by the input side sliding portion 52b and the output side sliding portion 53b, a fluid such as air, water, or oil is enclosed, and with the use of the pressure of the fluid, the force to be generated between the input member 14 and the output member 15 is controlled. It is possible to supply fluid to the space portion 54 through a pipe joint 55 from the outside. By introducing the fluid into and discharging the fluid from the space portion 54, the input side sliding portion 52b and the output side sliding portion 53b are slid relative to each other so as to change the distance M between the centers. The contact surface between the input side sliding portion 52b and the output side sliding portion 53b defines, for example, a slide bearing structure. The smaller the gap between the sliding portions 52b and 53b, the smaller the leakage of the fluid from the space portion 54, and therefore, it is possible to generate a great force.

As in the second preferred embodiment, the provision of the input side sliding portion 52b and the output side sliding portion 53b in the input side structure portion 52 and the output side structure portion 53, respectively, also facilitates the adjustment of the magnitude of the force to be generated between the input member 14 and the output member 15 by the structure body 5.

Figure 10:
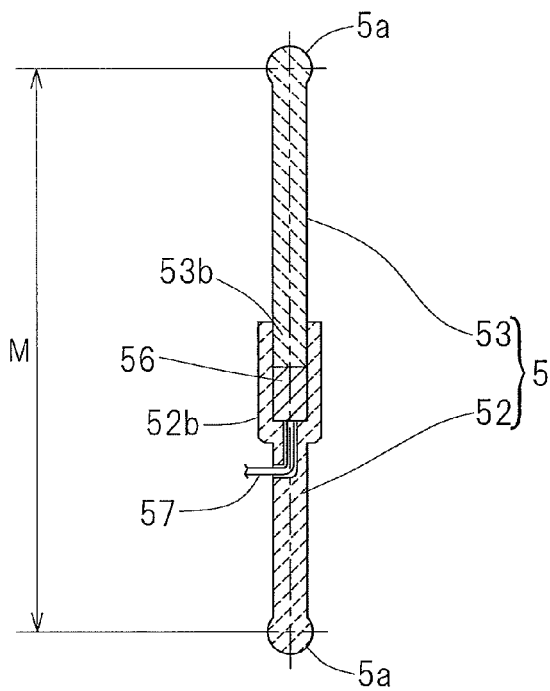
FIG. 10 is a longitudinal cross-sectional view of a structure body of a link actuating device according to a third preferred embodiment of the present invention.

Also, a structure body 5 of a link actuating device according to a third preferred embodiment shown in FIG. 10, similarly to the second preferred embodiment, includes an input side structure portion 52 provided with a cylindrical input side sliding portion 52*b* and an output side structure portion 53 provided with an output side sliding portion 53*b* slidable relative to the input side sliding portion 52*b*, so that the input side structure portion 52 and the output side structure portion 53 are slidable relative to each other. A piezo actuator 56 is provided in the space between the input side sliding portion 52*b* and the output side sliding portion 53*b*. The piezo actuator 56 is connected to an external power source through a wiring 57. The application of voltage to the piezo actuator 56 causes the piezo actuator 56 to expand or contract, which results in changing the distance M between the centers.

Also in the third preferred embodiment, similarly to the second preferred embodiment, the provision of the input side sliding portion 52*b* and the output side sliding portion 53*b* in the input side structure portion 52 and the output side structure portion 53, respectively, also facilitates the adjustment of the magnitude of the force to be generated between the input member 14 and the output member 15 by the structure in a similar manner to the above.

The controller 6 in FIG. 1 is a type of computerized numerical control, and sends an output command to the rotary actuators 30 and the electromagnetic brakes 29 of the respective immobilizing mechanisms 4 on the basis of signals from an attitude setting unit 60 to set the attitude of the output member 15 relative to the input member 14, an attitude detector 61 to detect the attitude of the output member 15 relative to the input member 14, and a torque detector 62 to detect the torques of the respective rotary actuators 30. The attitude setting unit 60 sets the attitude of the output member 15 by determining, for example, the bending angle θ (FIG. 3) and the angle of turn φ (FIG. 3). The attitude detector 61 detects, for example, the angles of rotation βn (β1 and β2 in FIG. 3) of the end portion link members 11*a* to 13*a* on the input side. The bending angle θ and the angle of turn φ have correlations with the angles of rotation βn, and therefore, it is possible to determine the bending angle θ and the angle of turn φ from the angles of rotation βn, or vice versa.

Where the output member 15 is immobilized in an arbitrary attitude relative to the input member 14, the controller 6 controls the rotary actuators 30 so as to increase the contact force acting between the contacting portions 5*a* of the structure body 5 and the contacted portions 51 of the input member 14 and the output member 15. In other words, the controller 6 controls the rotary actuators 30 so as to generate a force between the input member 14 and the output member 15. By doing so, the distance L is slightly changed between the link spherical surface center PA of the input member 14 and the link spherical surface center PC of and the output member 15, and therefore, the magnitude of the contact force acting on the contacted portions 51 of the input member 14 and the output member 15 is changed. Specifically, the contact force increases. There is a force acting to maintain the link actuating device 1 at a certain operating position against this contact force, and therefore, the rigidity of the entirety of the link actuating device 1 can be improved when attitude adjustment is made.

In addition, when the immobilizing mechanisms 4 immobilize the output member 15 in an arbitrary attitude relative to the input member 14, the controller 6 controls the rotary actuators 30 to be driven in the directions in which the forces generated by the respective rotary actuators 30 interfere with each other. If the forces generated by the respective rotary actuators 30 interfere with each other, the change in the attitude of the output member 15 relative to the input member 14 is suppressed, and the forces act on the entirety of the link actuating device 1. Because of this, the change in the distance L between the link spherical surface centers PA and PC is suppressed, and therefore, the rigidity of the entirety of the link actuating device 1 can be improved.

Where the attitude of the output member 15 is altered relative to the input member 14, control target values of the angles of rotation βn of the end portion link members 11*a* to 13*a* on the input side are calculated in accordance with the attitude of the output member 15 set by the attitude setting unit 60. The angles of rotation βn described above mean the operating positions of the respective rotary actuators 30. The calculation of βn is made by inverse-transforming the following formula 1. The inverse transform refers to a transform where the angles of rotation βn of the end portion link members 11*a* to 13*a* are calculated from the bending angle θ and the angle of turn φ.

$$\cos(\theta/2)\sin\beta n - \sin(\theta/2)\sin(\phi+\delta n)\cos\beta n + \sin(\gamma/2) = 0 \quad \text{(Formula 1)}$$

Here, γ (FIG. 3) is the angles between the axes of connecting ends of the intermediate link members 11*b* to 13*b*, rotatably connected to the end portion link members 11*a* to 13*a* on the input side, and the axes of connecting ends of the intermediate link members 11*b* to 13*b*, rotatably connected to the end portion link members 11*c* to 13*c* on the output side. Further, δn (δ1, δ2, and δ3 in FIG. 3) is the space angles, in the circumferential direction, of the end portion link members 11*a* to 13*a* on the input side relative to the end portion link member 11*a* on the input side, which serves as a reference.

After the control target values of the angles of rotation βn are calculated, two of the three rotary actuators 30 are subjected to feedback control, using signals from the attitude detector 61, such that the angles of rotation βn of the two rotary actuators 30 approach the control target values. The remaining one rotary actuator 30 is subjected to feedback control, using a signal from the torque detector 62, such that the torque generated by the remaining one rotary actuator 30 approaches a predetermined control target value.

Thus, by performing the positional control of two of the rotary actuators 30, the attitude of the output member 15 relative to the input member 14 is determined. By performing the torque control of the remaining actuator 30, it is possible to reduce the driving forces of the above two rotary actuators 30, and as a result, it is possible to make the rotary actuators 30 small and compact. If the positional control is performed in all of the rotary actuators 30, it is necessary to drive the rotary actuators 30 while coordinating the positions of all of the rotary actuators 30, resulting in reducing the operating speed. The positional control of, however, only two of the rotary actuators 30 enables smooth operations of the rotary actuators 30, resulting in increasing the operating speed.

As in the third preferred embodiment, if the force transmitting mechanism 43 is provided, control may be performed as follows instead of the above control. That is, the positional control is performed in two of the three rotary actuators 30 in a similar manner to the above, and the remaining one rotary actuator 30 is caused to operate in a servo-off state, which is the state where the feedback control function is off. The torques of the end portion link members 11*a* to 13*a* on the input side, driven by the two rotary actuators 30 in which positional control is performed, are transmitted to the remaining one rotary actuator 30 through the force transmitting mechanism 43, and therefore, it is possible to cause the remaining one rotary actuator 30 to operate even in the servo-off state.

To immobilize the output member 15 whose attitude is being changed, brakes are applied to the rotary shafts of the rotary actuators 30 with the brake devices 29 so as to stop the rotations of the respective rotary actuators 30. This makes it possible to maintain a certain angle even if the torques are transmitted to the rotary actuators 30, and therefore, the rigidity of the entirety of the link actuating device 1 can be improved when attitude adjustment is made.

The link actuating device 1 includes a two-degree-of-freedom mechanism in which the output member 15 is movable in two axial directions perpendicular to each other relative to the input member 14. This enables the link actuating device 1 to achieve a wide range of movement of the output member 15 even though it is compact. This provides an excellent operability to the drive device, such as a medical actuator, mounted on the output member 15. Further, the immobilizing mechanisms 4 are provided in all of the three link mechanisms 11 to 13, and therefore, when a force has been generated between the input member 14 and the output member 15 by the structure body 5, a preload is applied to the entirety of the link actuating device 1, resulting in reducing the rattling of the link actuating device 1, and increasing the rigidity of link actuating device 1. Even when a force is not generated between the input member 14 and the output member 15 by the structure body 5, the angles of all of the link mechanisms 11 to 13 are controlled, that is, there exists none of the free link mechanisms 11 to 13 in which angle control is not performed, when a force has acted on the output member 15. Accordingly, a rigidity of the entirety of the link actuating device 1 is high, and an accuracy of the attitude adjustment of the output member 15 relative to the input member 14 can be increased.

In addition, in the link actuating device 1, the structure body 5 is provided that connects the input member 14 and the output member 15 to each other while being in contact with the contacted portions 51 of the input member 14 and the output member 15. Thus, the structure body 5 generates a force, that is, applies a preload between the input member 14 and the output member 15, and therefore, it is possible to eliminate the rattling of the link actuating device 1, and to improve the rigidity of the link actuating device 1. As a result, the accuracy of the attitude adjustment of the output member 15 relative to the input member 14 can be improved. The structure body 5 can change the distance M between the centers of the contacting portions 5a at opposite ends thereof, and therefore the amount of preload can be easily adjusted.

Since the shaft portions 18 protrude from the outer peripheral surfaces of the input member 14 and the output member 15, and the shaft portions 18 are connected to the end portion link members 11a to 13a on the input side and the end portion link members 11c to 13c on the output side so as to be rotatable relative to each other, it is possible to secure wide spaces in the central portions of the input member 14 and the output member 15. This makes it possible to easily form the contacted portions 51 in these wide spaces.

The relative contacted portions 51 of the input member 14 and the output member 15 have spherical shapes whose centers conform with the link spherical surface centers PA and PC of the link mechanisms 11 to 13, and the contacting portions 5a of the structure body 5 have spherical shapes slidably fitted into the respective contacted portions 51. Thus, even if a change has been made in the attitude of the output member 15 relative to the input member 14, the state where the contacted portions 51 and the contacting portions 5a are always in contact with each other is maintained, without affecting the operation of the link actuating device 1.

Figure 11:
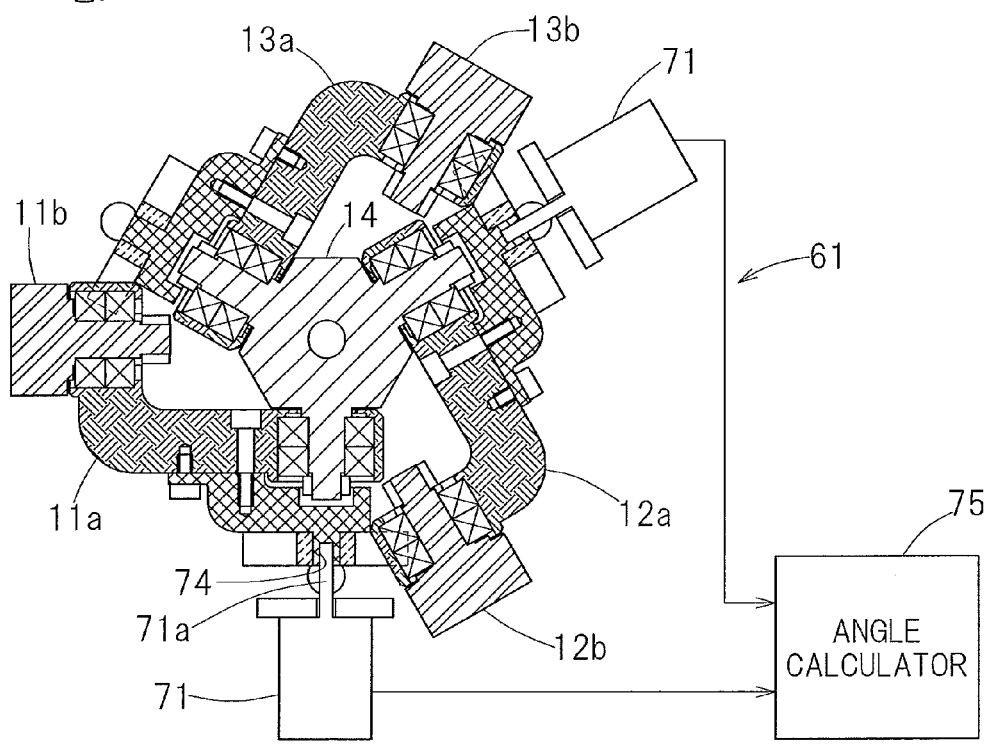
FIG. 11 is a diagram obtained by adding a block diagram of a control system to a longitudinal cross-sectional view of an input member, end portion link members on an input side, and an intermediate link member of a link actuating device according to a fourth preferred embodiment of the present invention.

FIG. 11 shows a fourth preferred embodiment, and is obtained by adding a block diagram of a control system to a diagram corresponding to FIG. 5. An attitude detector 61 shown in FIG. 11 has rotational angle detectors 71 provided in two or more of the three end portion link members 11a to 13a on the input side of the link mechanism section 3. In the illustrated example, two rotational angle detectors 71 detect the angles of rotation of the end portion link members 11a and 12a on the input side. For example, the rotational angle detectors 71 are rotary encoders, and have rotary shafts 71a fixedly inserted into holes 74 provided in the shaft portions 18 of the input member 14.

Output signals from the two rotational angle detectors 71 are sent to an angle calculator 75. The angle calculator 75 calculates, from the output signals, the bending angle θ (FIG. 3) and the angle of turn φ (FIG. 3) representing the position and the attitude of the output member 15, respectively, and sends them to the controller 6.

It should be noted that the calculations of the bending angle θ and the angle of turn φ by the angle calculator 75 are performed by forward-transforming the above formula 1. The forward transform refers to a transform where the bending angle θ and the angle of turn φ are calculated from the angles of rotation of the end portion link members 11a to 13a on the input side.

As in the fourth preferred embodiment, the provision of the rotational angle detectors 71 enables feedback control using the values detected by the rotational angle detectors 71. This reduces the influences of the rattling of the immobilizing mechanisms 4 and the rigidity of the immobilizing mechanisms 4, and as a result, the accuracy of the attitude adjustment of the output member 15 relative to the input member 14 can be improved.

As described above, although the preferred embodiments have been described with reference to the accompanying drawings, those skilled in the art will readily conceive numerous changes and modifications within the framework of obviousness upon the reading of the specification herein presented of the present invention. Accordingly, such changes and modifications are to be construed as included in the scope of the present invention as delivered from the claims annexed hereto.

REFERENCE NUMERALS

1: link actuating device
4: immobilizing mechanism
5: structure body
5a: contacting portion
6: controller
11, 12, 13: link mechanism
11a, 12a, 13a: end portion link member on input side
11b, 12b, 13b: intermediate link member
11c, 12c, 13c: end portion link member on output side
14: input member
15: output member
29: brake device
30: rotary actuator
43: force transmitting mechanism
50: recessed portion
51: contacted portion
52: input side structure portion
52a: female threaded portion
52b: input side sliding portion
53: output side structure portion
53a: male threaded portion
53b: output side sliding portion
54: space portion
56: piezo actuator
71: rotational angle detector

What is claimed is:

1. A link actuating device to connect an output member to an input member through three or more set of link mechanisms for alteration in posture, each of the link mechanisms including:
   end portion link members on an input side and an output side having one ends thereof rotatably connected respectively to the input member and the output member;
   an intermediate link member to which the other ends of the respective end portion link members on the input side and the output side are rotatably connected;
   immobilizing mechanisms to immobilize the output member in an arbitrary attitude relative to the input member are provided in all of the three or more link mechanisms, the immobilizing mechanisms each including an actuator connected directly or indirectly to the end portion link member on the input side, the actuators acting so as to restrain rotation of the end portion link member on the input side relative to the input member;
   a structure body is provided to connect the input member and the output member to each other while being in contact with a contacted portion formed in the input member and a contacted portion formed in the output member; and
   a controller that, when the immobilizing mechanisms immobilize the output member in an arbitrary attitude relative to the input member, controls the actuators so as to increase a contact force acting between the structure body and the contacted portions of the input member and the output member,
   wherein a geometric model representing each of the link mechanisms by a straight line is such that an input side portion and an output side portion of each of the intermediate link members relative to an intermediate portion of each of the intermediate link members are symmetrical to each other.

2. The link actuating device as claimed in claim 1, wherein when the immobilizing mechanism immobilizes the output member in an arbitrary attitude relative to the input member, the controller controls the actuators so as to drive the actuators in directions in which forces generated by the respective actuators interfere with each other.

3. The link actuating device as claimed in claim 1, wherein when the attitude of the output member is altered relative to the input member, the controller controls two of the actuators such that operating positions of the two actuators approach predetermined control target positions, and controls at least one remaining actuator such that a torque generated by the at least one remaining actuator approaches a predetermined control target position.

4. The link actuating device as claimed in claim 1, further comprising a force transmitting mechanism capable of transmitting forces between the respective actuators and the respective end portion link members on the input side,
   wherein when the attitude of the output member is altered relative to the input member, the controller controls two of the actuators such that operating positions of the two actuators approach predetermined control target positions, and controls at least one remaining actuator such that a torque generated by the at least one remaining actuator approaches a predetermined control target position, or drives the at least one remaining actuator in a servo-off state where a feedback control function is off.

5. The link actuating device as claimed in claim 1, wherein each of the actuators is a rotary actuator having a brake device that locks a rotation of a rotary shaft of the rotary actuator, and when the output member is immobilized in an arbitrary attitude relative to the input member, the brake device is actuated.

6. The link actuating device as claimed in claim 1, wherein the attitude of the output member relative to the input member is controlled by inverse-transforming a formula represented by $\cos(\theta/2)\sin\beta n - \sin(\theta/2)\sin(\phi+\delta n)\cos\beta n + \sin(\gamma/2) = 0$,
   where an angle of rotation of the end portion link member on the input side relative to the input member is $\beta n$;
   an angle between an axis of a connecting end of the intermediate link member, rotatably connected to the end portion link member on the input side, and an axis of a connecting end of the intermediate link member, rotatably connected to the end portion link members on the output side, is $\gamma$;
   a space angle, in a circumferential direction, of each of the end portion link members on the input side relative to one of the end portion link members on the input side, which serves as a reference, is $\delta n$;
   a vertical angle of an inclination of the output member relative to a center axis of the input member is $\theta$; and
   a horizontal angle of an inclination of the output member relative to the center axis of the input member is $\phi$.

7. The link actuating device as claimed in claim 1, wherein the structure body generates a force between the input member and the output member.

8. The link actuating device as claimed in claim 1, wherein each of the input member and the output member has the same number of shaft portions as the number of the link mechanisms, the shaft portions protruding from an outer peripheral surface thereof,
   the end portion link members on the input side and the output side of each of the link mechanisms are rotatably connected to the shaft portions, and
   the contacted portions are arranged radially inwardly of the shaft portions.

9. The link actuating device as claimed in claim 1, wherein the contacted portions of the input member and the output member have spherical shapes whose centers conform with link spherical surface centers of the respective link mechanisms, and the structure body has opposite ends provided with spherical contacting portions that are slidably fitted into the contacted portions.

10. The link actuating device as claimed in claim 1, wherein the input member has a recessed portion that is conical and tapered on an end face thereof on the output member side, and the output member has a recessed portion that is conical and tapered on an end face thereof on the input member side, and
    innermost portions of the recessed portions serve as the contacted portions.

11. The link actuating device as claimed in claim 10, wherein a maximum bending angle of a bending angle, which is an angle between a center line of the input member and a center line of the output member, is $\theta_{max}$; and
    an angle between a generatrix of an inner peripheral surface of the recessed portion of the input member and the center line of the input member, and an angle between a generatrix of an inner peripheral surface of the recessed portion of the output member and the center line of the output member are both $\theta_{max}/2$.

12. The link actuating device as claimed in claim 1, further comprising rotational angle detectors provided in two or more of the three or more link mechanisms to detect angles of rotation of the end portion link members on the input side.

13. The link actuating device as claimed in claim 12, wherein the attitude of the output member relative to the input member is estimated by forward-transforming a formula represented by $\cos(\theta/2)\sin\beta n - \sin(\theta/2)\sin(\phi+\delta n)\cos\delta n + \sin(\gamma/2) = 0$, where an angle of rotation of the end portion link member on the input side relative to the input member is $\beta n$;

an angle between an axis of a connecting end of the intermediate link member, rotatably connected to the end portion link member on the input side, and an axis of a connecting end of the intermediate link member, rotatably connected to the end portion link members on the output side, is $\gamma$;

a space angle, in a circumferential direction, of each of the end portion link members on the input side relative to one of the end portion link members on the input side, which serves as a reference, is $\delta n$;

a vertical angle of an inclination of the output member relative to a center axis of the input member is $\theta$; and a horizontal angle of an inclination of the output member relative to the center axis of the input member is $\phi$.

14. A link actuating device to connect an output member to an input member through three or more set of link mechanisms for alteration in posture, each of the link mechanisms including:

end portion link members on an input side and an output side having one ends thereof rotatably connected respectively to the input member and the output member;

an intermediate link member to which the other ends of the respective end portion link members on the input side and the output side are rotatably connected;

a structure body to connect the input member and the output member to each other while being in contact with a contacted portion formed in the input member and a contacted portion formed in the output member, wherein the contacted portions of the input member and the output member have spherical shapes whose centers conform with link spherical surface centers of the respective link mechanisms, and the structure body has opposite ends provided with spherical contacting portions that are slidably fitted into the contacted portions, the structure body includes an input side structure portion having a contacting portion fitted into the contacted portion of the input member and an output side structure portion having a contacting portion fitted into the contacted portion of the output member, and a controller is provided to control changing a distance between centers of the contacting portions of the input side structure portion and the output side structure portion.

15. The link actuating device as claimed in claim 14, wherein one of the input side structure portion and the output side structure portion has a male threaded portion, and the other thereof has a female threaded portion engaged with the male threaded portion, and by changing an amount of thread engagement between the male threaded portion and the female threaded portion, the distance between the centers of the contacting portions of the input side structure portion and the output side structure portion is adjusted.

16. The link actuating device as claimed in claim 14, wherein an input side sliding portion and an output side sliding portion are provided in the input side structure portion and the output side structure portion, respectively, so as to be slidable relative to each other along a straight line connecting centers of spherical contacting portions of the input side structure portion and the output side structure portion.

17. The link actuating device as claimed in claim 16, wherein the input side structure portion and the output side structure portion form a space portion, so that a fluid is introduced and discharged into and from the space portion, thereby sliding the input side sliding portion and the output side sliding portion relative to each other.

18. The link actuating device as claimed in claim 16, further comprising a piezo actuator that slides the input side sliding portion and the output side sliding portion relative to each other.

19. The link actuating device as claimed in claim 14, wherein each of the link mechanisms further includes immobilizing mechanisms to immobilize the output member in an arbitrary attitude relative to the input member are provided in all of the three or more link mechanisms, wherein a geometric model representing each of the link mechanisms by a straight line is such that an input side portion and an output side portion of each of the intermediate link members relative to an intermediate portion of each of the intermediate link members are symmetrical to each other.

\* \* \* \* \*